Dec. 13, 1949  E. I. VALYI  2,491,343

INJECTION-MOLDING MACHINE

Filed May 6, 1947  4 Sheets-Sheet 1

INVENTOR.
EMERIK I. VALYI
BY
Wm. S. Pritchard
ATTORNEY.

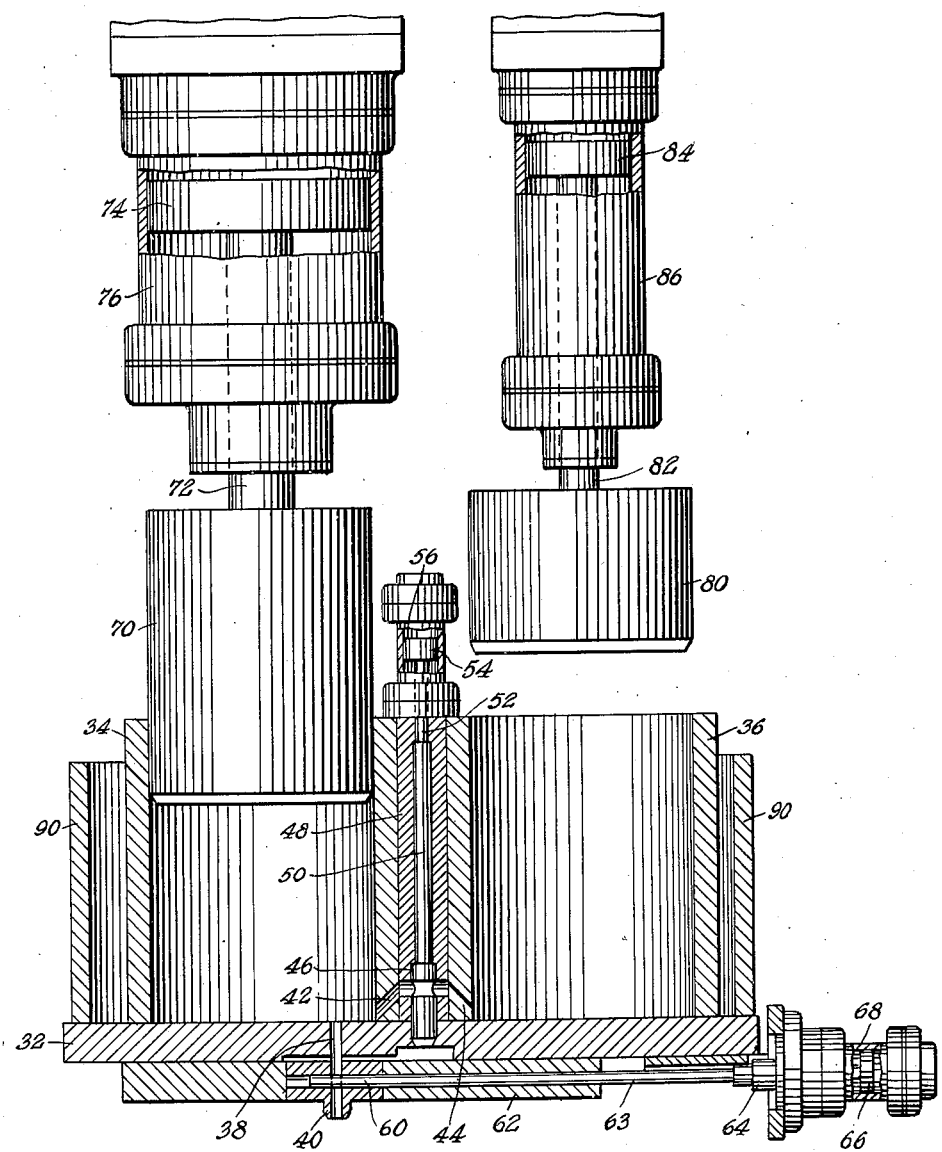

Dec. 13, 1949 E. I. VALYI 2,491,343
INJECTION-MOLDING MACHINE
Filed May 6, 1947 4 Sheets-Sheet 3
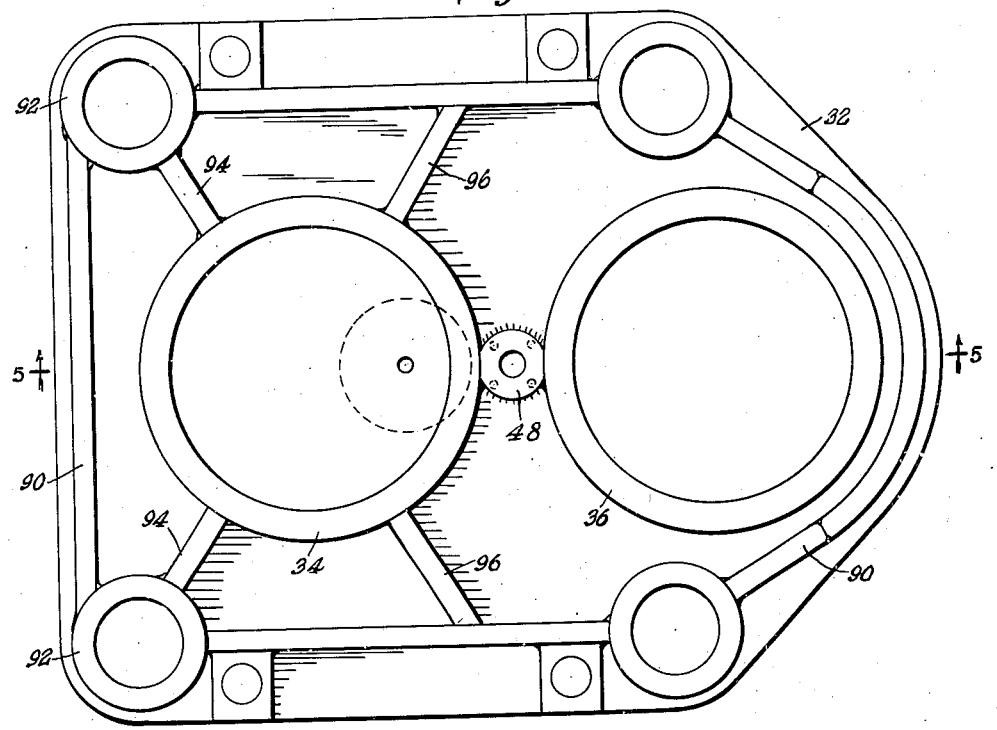
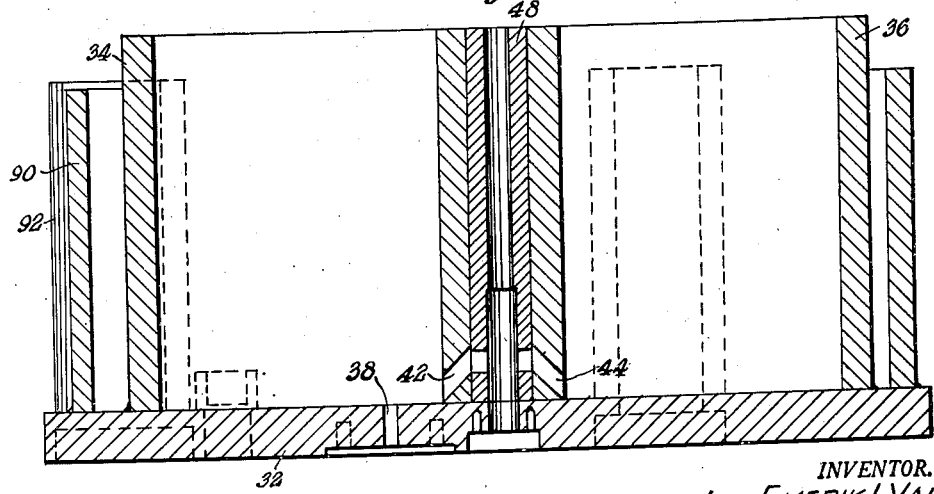
INVENTOR.
EMERIK I. VALYI
BY
Wm. S. Pritchard
ATTORNEY Patented Dec. 13, 1949

2,491,343

UNITED STATES PATENT OFFICE 2,491,343

INJECTION-MOLDING MACHINE

Emerik I. Valyi, New York, N. Y., assignor to A. R. D. Corporation, New York, N. Y., a corporation of New York Application May 6, 1947, Serial No 746,361

9 Claims. (Cl. 18—30)

1

This invention relates to molding machines. More particularly, it relates to a new and improved injection-molding machine.

Thermoplastic materials have been molded by a process known as "injection molding." In such process, the selected thermoplastic material, in a properly granulated form, was stored in a hopper, the outlet of which was connected to a pressure chamber and into which the thermoplastic material dropped by gravity. The outlet of the hopper was controlled by a reciprocating plunger which, in retracted position, permitted the molding material to drop into the pressure chamber. During the molding operation, the plunger forced the granulated material from the pressure chamber through a so-called torpedo, which consisted of a number of holes arranged on a circle. All of the holes entered into a channel at the nozzle, from where the molding composition reached the mold cavity proper. The torpedo was surrounded by a heating unit, such as a heated jacket or an electrical band heater, to raise the temperature of the molding composition to that required for injection molding while it passed the torpedo.

The temperature distribution of the molding composition within the torpedo was not uniform. Generally, the molding composition could not be raised to a uniform molding temperature throughout its mass, and it was exceedingly difficult, if not impossible, to provide a consistent temperature distribution of the molding composition within the torpedo for each of the molding compositions.

An important factor in injection molding is the control of the moisture of the molding composition. Usually, the moisture was driven off before the composition was fed into the hopper of the molding machine. However, frequently the molding composition became moist while stored in the hopper. To avoid this, extremely inconvenient means were resorted to in order to insure dryness of the molding composition.

As previously mentioned, the above-described molding machine required the molding composition to be in a properly granulated form and thereby imposed a certain restriction on the type of plastic used. Thus, for example, if the plastic should become tacky and soft, as might happen on a hot summer day, the feed, above described, would not function at all. Hence, it was almost impossible to mold substances such as commercial wax.

In certain instances, it is technically desirable to mold molding wax, low molecular weight resins, nylon, and polyethylene in a condition of extremely low viscosity or even in a liquid condition. Such practice, wherein the requirements as to temperature control are increasingly important because the molding temperature is critical within a few degrees (F.), could not be carried out by the aforementioned apparatus.

In carrying out the molding cycle of the previously described process, the pressure plunger first had to force a considerable amount of cold elastic granulated mold composition into the torpedo and through this medium extrude from the torpedo the molding composition that had been previously brought to the temperature thereof. Since the temperature distribution of the molding composition was inadequate, high pressures, such as 10,000–30,000 pounds per square inch, had to be used to insure flow of those portions of the molding composition that had not reached a sufficient degree of plasticity.

An object of this invention is to provide a new and improved molding machine, particularly a new and improved injection-molding machine.

Another object of this invention is to provide a molding machine wherein the temperature distribution is substantially uniform throughout the molding composition.

An additional object of this invention is to provide a molding machine wherein the molding composition will be protected from moisture and oxygen.

A further object of this invention is to provide a molding machine wherein the consistency of the molding composition at molding temperature will not influence the operation of the machine in any way.

A still further object of this invention is to provide a molding machine wherein molding can be accomplished at pressures considerably lower than that required by the conventional method of injection molding.

A still further object of this invention is to provide an injection cylinder and a storage cylinder and means to transfer the contents of the storage cylinder to the injection cylinder when the contents of the injection cylinder reaches a predetermined level.

Other and additional objects will become apparent hereinafter.

The objects of the invention are accomplished, in general, by providing an injection-molding machine, having a reciprocable platen carrying the die members together with a core plate and an ejector plate, with an injection cylinder and a storage cylinder within a heated jacket so arranged that the heating medium in said jacket will completely and uniformly heat the contents of both cylinders. The injection cylinder is provided at the bottom thereof with a passage having at its outer end a nozzle which is adapted to communicate with a gate leading to the mold cavities in the die members whereby, upon the application of pressure, as by a plunger, to the contents in the injection cylinder, the molding composition will be extruded therefrom into the mold cavities. A valve, which at predetermined intervals opens and closes the passage leading from the pressure cylinder to the nozzle, controls the extrusion of the molding composition from the pressure cylinder. Means are provided to transfer the contents of the storage cylinder to the injection cylinder when the contents in the latter has reached a predetermined level.

In one embodiment of the invention, the injection cylinder and the storage cylinder are connected by a valve-controlled passage, which valve is actuated at a predetermined interval to permit the transfer. The transfer of the contents of the storage cylinder is effected by means of a storage cylinder plunger which is actuated at the required time. During this operation, the pressure on the injection cylinder plunger is released. Normally, the storage cylinder plunger rests on the contents of the storage cylinder whereby such contents is protected from moisture and oxygen.

In operation, both cylinders are filled with the molding composition and both plungers are lowered into the cylinders so that they will rest on the contents thereof. After the composition has been brought to the desired temperature, the movable platen is elevated into molding position, and pressure on the contents of the injection cylinder is applied through the injection cylinder plunger. At this time, the storage cylinder plunger rests on the contents in the storage cylinder without exerting any substantial pressure. The valve controlling the feed from the injection cylinder is operated to permit the molding composition to be extruded into the die cavity through the nozzle. From now on, the plunger in the injection cylinder will maintain the molding composition therein under constant pressure and will not reciprocate while the plunger in the storage cylinder merely rests on the composition therein without exerting any pressure. The opening and closing of the valve will control extrusion into the injection mold. After each injection and solidification of the molding, the movable platen is retracted, the molding removed, and the platen returned to molding position. Operation in this manner is continued until the contents of the injection cylinder has reached a predetermined level, whereupon the valve controlling communication between the injection cylinder and the storage cylinder will be opened automatically, while the valve controlling extrusion from the injection cylinder will be closed. At this time, pressure is applied to the contents in the storage cylinder by the plunger therein and pressure on the injection cylinder plunger released so that, as the injection cylinder is being filled, the plunger therein will rise. After the transfer has been completed, operation is resumed.

While the molding operation is in progress, the storage cylinder is refilled and the storage cylinder plunger disposed in the storage cylinder so that it will rest on the contents therein. Usually, the two cylinders are made of a size so that there will be sufficient material for a full day's operation. In such case, the preferred mode of operation is to load both cylinders at the end of the day and allow the molding composition to reach the proper molding temperature throughout its mass by the beginning of the next day.

The elevation and retraction of the movable platen and the operation of the various plungers as well as the operation of the various valves are performed in the desired timed sequence. In the preferred embodiment of the invention, the operations are secured by pneumatic-actuated means which are operated in timed sequence by electrical mechanisms.

The invention will be more clearly understood by reference to the following detailed description when taken in connection with the accompanying drawings, wherein:

Figure 3 is a partial vertical section showing the injection and storage cylinders, the plungers cooperating therewith, the transfer valve, and the valve controlling the extrusion from the injection cylinder;

Figure 4 is a top plan view showing the arrangement of the pressure and storage cylinders within the jacket;

Figure 5 is a section taken on the line 5—5 of Figure 4; and

Figure 1:
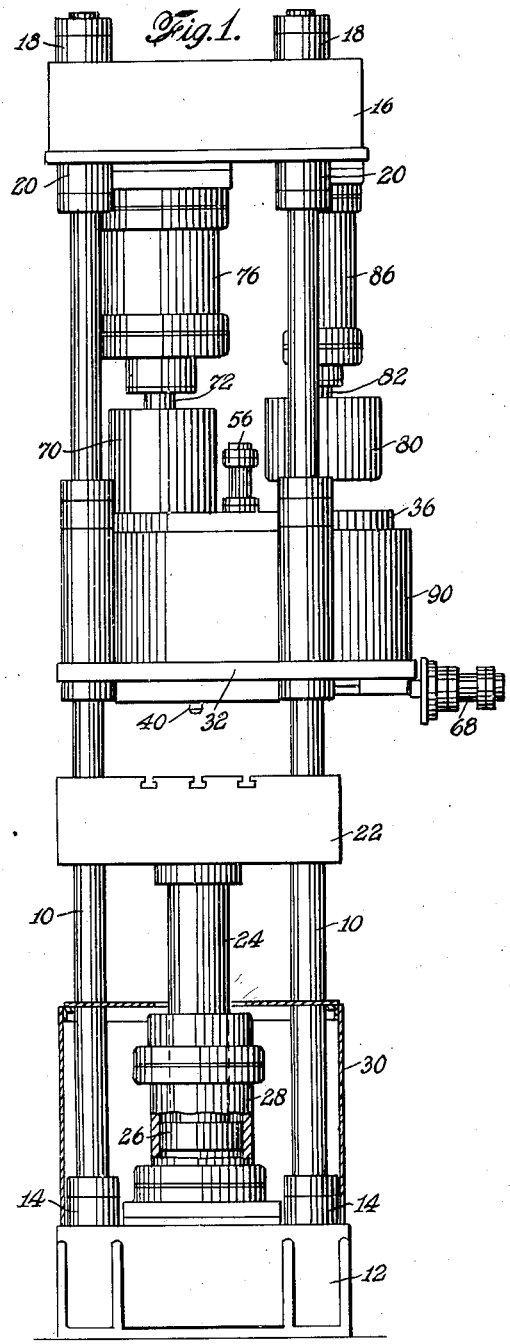
Figure 1 is an elevation of an injection-molding machine embodying the present invention.
Figure 2:
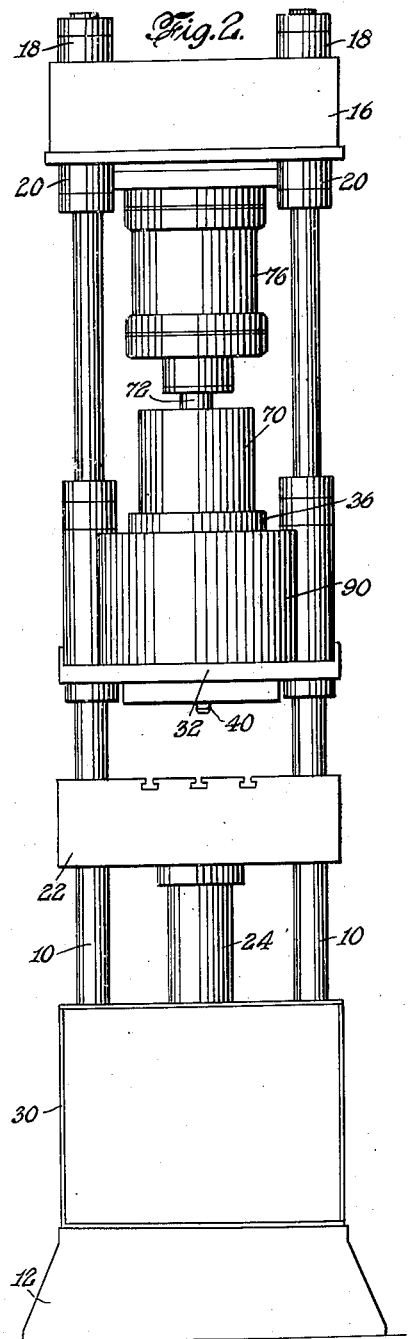
Figure 2 is a side view of the machine shown in Figure 1.

Referring now to the drawings, wherein like reference numerals designate like parts, the reference numeral 10 designates a plurality of vertical posts, the lower ends of which are threadedly secured in an approriate base 12 and maintained in secured position by the nuts 14. At the top, the posts 10 carry a plate 16, and the rods are secured thereto by means of nuts 18 and 20. It is to be understood that the portions of the posts which cooperate with the nuts 14, 18 and 20 are threaded.

A platen 22, slidably mounted on the posts 10, is secured to one end of a piston rod 24, the other end of which carries a reciprocable piston 26 slidably disposed in a hydraulic cylinder 28 appropriately mounted in the machine beneath the platen. A housing 30, appropriately secured on the posts 10 and base 12, encloses the cylinder 28.

The movable platen 22 is of the usual type wherein the molding cavity is formed by a pair of complemental, relatively movable die members and can be provided with a core plate and ejector plate carrying ejector pins. Preferably, the movable platen is of a construction wherein the core plate and the ejector plate are removed by pneumatic-actuated means, such as shown in copending applications Serial No. 699,547, filed September 26, 1946, now Patent No. 2,485,336 and Serial Nos. 725,381 and 725,382, filed January 30, 1947 now Patent Nos. 2,485,283 and 2,485,284. Since the details of construction of the movable platen and the associated stripper mechanism form no part of this invention, further description thereof is deemed unnecessary.

A plate 32 is rigidly secured on the posts 10 in any convenient manner and, as will hereafter appear, it constitutes a fixed injector plate. An injection cylinder 34 and a storage cylinder 36 are secured on the plate 32 in spaced relationship, as shown in Figures 3, 4 and 5. The injection cylinder 34 cooperates with a passage 38 which communicates with an extrusion nozzle 40 whereby the contents of the injection cylinder can be extruded into the molding cavity of the movable platen 22, as will hereafter become apparent.

Both the injection cylinder 34 and the storage cylinder 36 are provided adjacent the bottoms thereof with openings 42 and 44 respectively, and communication therebetween is controlled by a valve 46 mounted in a housing 48 located between and secured, as by welding, to both cylinders. The housing 48 is also secured on the plate 32. It is to be noted that the plate 32 is provided with a hole to accommodate the valve 46. The valve 46 is carried at one end of a valve stem 50, the other end of the valve stem 50 being secured to one end of a piston rod 52. The other end of the piston rod 52 is secured to a reciprocable piston 54 slidably mounted in a hydraulic cylinder 56 appropriately mounted in the machine. It is apparent that upon the raising and lowering of the valve 46 through the actuation of the piston 54 in the necessary direction, communication between the injection cylinder 34 and the storage cylinder 36 through the openings 42 and 44 may be made or interrupted.

The extrusion of the molding composition from the injection cylinder 34 through the passage 38 and the nozzle 40 is controlled by a valve. Though any type of valve can be used, in the form shown a slide valve 60 is slidably mounted in a valve casing 62 secured to the under surface of the plate 32. The valve 60 is carried at one end of a stem 63, the other end of which is secured to one end of a piston rod 64. The other end of the piston rod 64 carries a reciprocable piston 66 slidably mounted in a hydraulic cylinder 68 appropriately mounted in the machine. It is manifest that upon reciprocation of the piston 66, the valve 60 will open and close the discharge from the injection cylinder 34.

In order to extrude the contents from the injection cylinder through the nozzle 40, there is provided a plunger 70 carried at one end of a piston rod 72. The other end of the piston rod 72 is secured to a reciprocable piston 74 slidably mounted in a hydraulic cylinder 76 appropriately mounted in the machine.

A plunger 80 cooperates with the storage cylinder 36 and it is secured to one end of a piston rod 82. On its opposite end, the piston rod 82 is provided with a reciprocable piston 84 which is slidably mounted in a hydraulic cylinder 86 appropriately mounted in the machine.

Both cylinders 34 and 36 are disposed within a jacket 90 which serves as a reservoir for a heating medium, such as oil, which can be circulated or stationary. Suitable known means (not shown) are provided for heating the oil to and maintaining it at the desired temperature. The walls of the jacket 90 are welded, as shown in Figure 4, to cylindrical supports 92 secured to the plate 32. Appropriate reinforcing elements 94 and 96 respectively secure the injection cylinder 34 to the adjacent members 92 and the walls of the jacket 90. In general, the jacket 90 is of a height lower than that of the cylinders 34 and 36.

As previously mentioned, the hydraulic mechanisms are operated in timed sequence in accordance with the desired operation by electrical actuating means. The hydraulic and electrical circuits shown schematically in Figure 6 will now be described.

Figure 6:
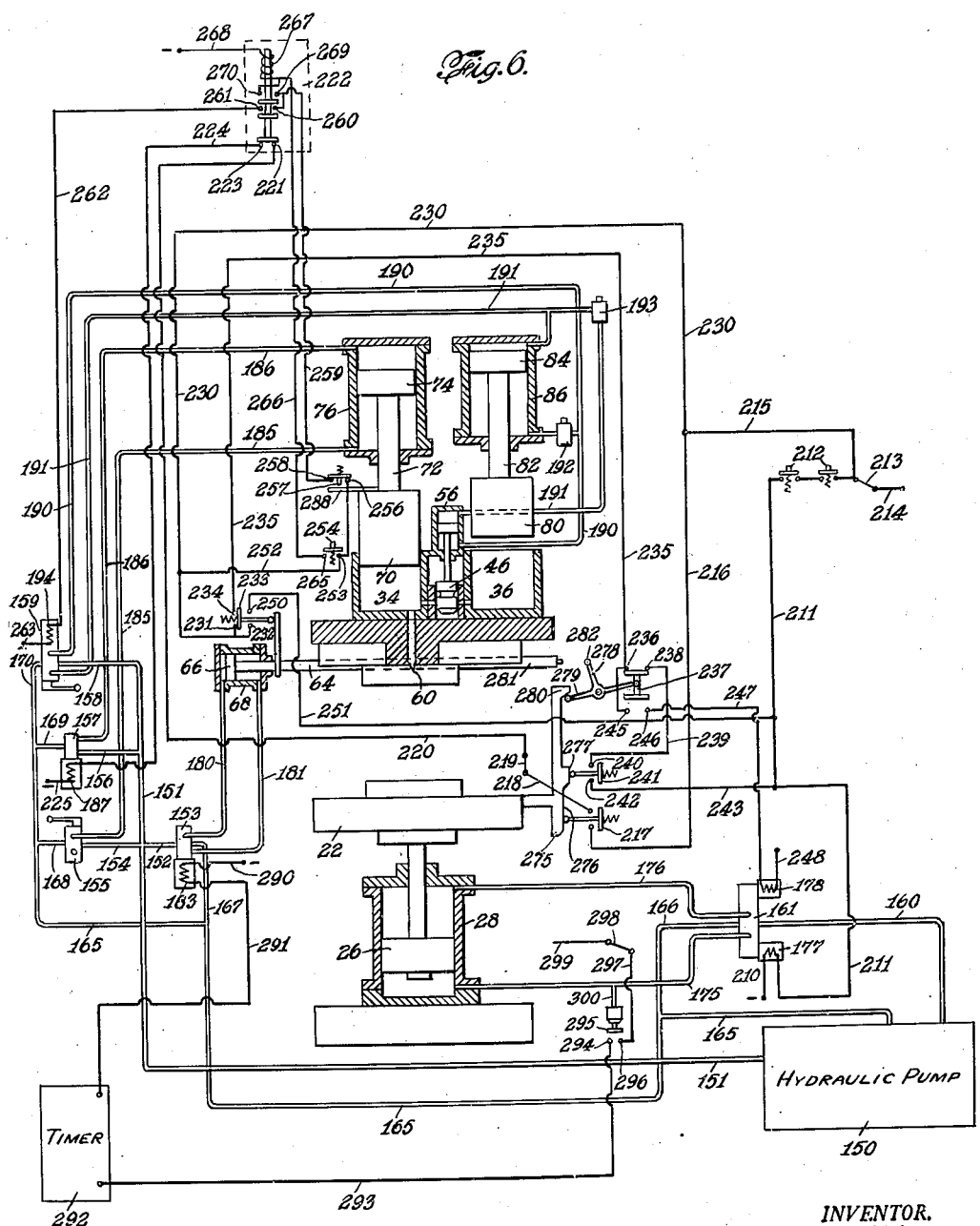
Figure 6 is a schematic diagram showing the hydraulic and electric circuits.

Referring to Figure 6, hydraulic pressure is supplied by a pump 150 to a high pressure line 151 which is connected by a line 152 to a solenoid-operated four-way valve 153, by a line 154 to a manually-operated two-way valve 155, by a line 156 to a solenoid-operated two-way valve 157, and by a line 158 to a solenoid-operated four-way valve 159. High pressure fluid is also supplied by the pump 150 through a line 160 to a solenoid-operated four-way valve 161. Low pressure fluid is returned to the pump 150 by a return line 165. This line is connected by a line 166 to the valve 161, by a line 167 to the valve 153, by a line 168 to the valve 155, by a line 169 to the valve 157, and by a line 170 to the valve 159.

The valve 161 is connected by lines 175 and 176 to the bottom and top respectively of the cylinder 28. This valve 161 is of the double-solenoid-actuated type having solenoids 177 and 178 which are adapted respectively, when energized, to connect the high pressure line 160 to the line 175 and the low pressure line 166 to the line 176, or vice versa, for raising or lowering the piston 26.

The valve 153 is connected by lines 180 and 181 to the opposite ends of the cylinder 68 and is provided with a solenoid 183 which is adapted, when energized, to connect the line 180 to the high pressure line 152 and the line 181 to the low pressure line 167 so that when the solenoid 183 is energized the piston 66 is moved to the right, and when the solenoid 183 is de-energized the reverse connections are made to shift the piston 66 to the left.

The manual valve 155 is connected by a line 185 to the lower end of the cylinder 76 and is adapted to connect the high pressure line 154 or the low pressure line 168 to the line 185 according to the position of the valve 155.

The valve 157 is connected by a line 186 to the top of the cylinder 76 and is actuated by a solenoid 187 in a manner to connect the high pressure line 152 to the line 186 when the solenoid 187 is energized and to connect the low pressure line 169 to the line 186 when the solenoid 187 is de-energized.

The four-way solenoid-actuated valve 159 is connected by lines 190 and 191 to the bottom and top respectively of the cylinder 86 and to the bottom and top respectively of the cylinder 56. A delayed action sequence valve 192 is interposed in the connection from the line 190 to the bottom of the cylinder 86, and a delayed action sequence valve 193 is interposed in the connection from the line 191 to the top of the cylinder 56. The valve 159 is actuated by a solenoid 194 and is so constructed that when the solenoid 194 is energized, the high pressure line 158 is connected to the line 191 and the low pressure line 170 is connected to the line 190, and, when de-energized, the reverse connection takes place to connect the low pressure line 170 to the line 191 and the high pressure line 158 to the line 190.

The solenoid 177 is connected by a lead 210 to one side of a power supply line (not shown) and by a lead 211 through a pair of manual switches 212 in series and switch 213 to a lead 214 which is connected to the other side of the power supply line. The switch 213 is also connected by a lead 215 to a lead 216 which is connected to one contact of a switch 217, thence from the other contact of the switch 217 by a lead 218 to a switch 219 and by a lead 220 to a contact 221 of a relay 222. Contact 223 of the relay 222 is connected by a lead 224 to one side of the solenoid 187, the other side of which is connected by a lead 225 to the return side of the power supply. The lead 216 is also connected by a lead 230 to contacts 231 and 232 of a switch 233. Contact 234 of the switch 233 is connected by a lead 235 to a contact 236 of a switch 237. Contact 238 of the switch 237 is connected by a lead 239 to contact 240 of a switch 241. Contact 242 of the switch 241 is connected by a lead 243 to the lead 211. The contact 236 of the switch 237 is also connected to a contact 245 of said switch. The contact 246 of the switch 237 is connected by a lead 247 to one side of the solenoid 178, the other side of which is connected by a lead 248 to the return side of the power supply line. Contact 250 of the switch 233 is connected by a lead 251 to the lead 211.

The lead 230 is also connected by a lead 252 to a contact 253 of a switch 254, thence by a lead 255 to a contact 256 of a switch 257 having a second contact 258 which is connected by a lead 259 to contacts 260 and 269 of the relay 222. Contact 261 of the relay 222 is connected by a lead 262 to one side of the solenoid 194, the other side of which is connected by a lead 263 to the return side of the power supply line. A second contact 265 of the switch 254 is connected by a lead 266 to one side of the coil 267 of the relay 222, the other side of which is connected by a lead 268 to the return side of the power supply line. The coil 267 is also connected to a contact 270 of the relay 222, which completes a holding circuit.

The switches 217 and 241 are normally held open when the platen 22 is in its lower position by a bar 275 attached to the platen 22, having surfaces 276 and 277 adapted to engage and hold the switches 217 and 241 respectively in open position. The bar 275 releases and closes the switches when the platen has been elevated from its lower position. The switch 237 is actuated by a bell lever 278 having an arm 279 which is engaged by a finger 280 attached to the bar 275 to close the contacts 236 and 238 when the bar 275 and platen 22 reach their lower positions. The valve 60 carries a plunger 281 which is adapted to engage an arm 282 of the bell lever 278 for actuating the same to close the contacts 245 and 246 when the valve 60 and plunger 281 reach their right-hand positions.

The piston rod 64 carries an arm 285 which, when the rod is in its left-hand position, actuates the switch 233 to hold the contacts 231 and 234 closed. When the piston rod 64 and the arm 285 move to the right, the switch 233 is released and is spring-actuated to close the contacts 232 and 250.

The piston rod 72 carries an arm 288 which engages the switch 257 when the rod is in its upper position to open the contacts 256 and 258. The arm 288 is adapted to engage the switch 254 when in its lower position to close the contacts 253 and 265.

One side of the solenoid 183 is connected by a lead 290 to one side of the power supply line. The other side of the solenoid 183 is connected by a lead 291 to a timer 292 which is adapted, when energized, to maintain a closed circuit for a predetermined period of time and then to break the circuit. The timer 292 is connected by a lead 293 to a contact 294 of a switch 295, a second contact 296 of which is connected by a lead 297 to a switch 298 and thence by a lead 299 to the other side of a power supply line. The switch 295 is of the pressure-actuated type and is connected by a duct 300 to the line 175 to receive pressure therefrom and is adapted to close the contacts 294 and 296 in response to a predetermined pressure in the line 175.

In the operation of this system, the switches 213, 298 and 219 are first closed. The operating cycle is then initiated by the operator manually closing the two manual switches 212. When these switches are closed, a circuit is completed from the lead 214 through the lead 211 to the solenoid 177, thereby energizing the solenoid 177 and actuating the valve 161 in a direction to supply high pressure fluid to the bottom of the cylinder 28. This causes the piston 26 and the platen 22 to rise and to bring the die into position to receive a charge from the injection cylinder 34.

When the platen 22 rises, the switch 217 is closed, thereby completing a circuit from the lead 214 through leads 215 and 216, switch 217, lead 218, switch 219, lead 220, closed contacts 221 and 223 of the relay 222, and lead 224 to the solenoid 187. Actuation of the solenoid 187 shifts the valve 157 in a direction to supply fluid under high pressure through the line 186 to the top of the cylinder 76, thereby forcing the piston 74 and the plunger 70 downwardly to apply pressure to the molding material in the injection cylinder 34.

Raising of the platen 22 also closes the switch 241, establishing a holding circuit for the solenoid 177 from lead 214 through leads 215, 230, contacts 231 and 234 of switch 233, lead 235, contacts 236 and 238 of switch 237, lead 239, contacts 240 and 242 of switch 241, and lead 243 back to the lead 211. The solenoid 177 thus remains energized after the operator releases the manual switches 212.

After the platen 22 reaches its upper position, pressure is built up in the lower end of the cylinder 28 and the line 175 to a value such that the pressure-actuated switch 295 closes. When this switch closes, a circuit is established from the lead 299 through switch 298, lead 197, contacts 296 and 294, lead 293, timer 292, lead 291 to one side of the solenoid 183, thence by the lead 290 to the other side of the power supply line. Energization of the solenoid 183 actuates the valve 153 to apply fluid under high pressure to the head end of the cylinder 68, thereby forcing the piston 66 to the right and opening the valve 60 to permit the molding material to be injected from the cylinder 34 into the mold on the platen 22. When the piston rod 64 moves to the right, the contacts 231 and 234 of the switch 233 are opened and the contacts 232 and 250 are closed. Closing the contacts 232 and 250 establishes the holding circuit for the solenoid 177 through the lead 251, thereby cutting the switch 237 out of the holding circuit. When the piston 66 and the plunger 64 reach their extreme right-hand positions, the switch 237 is actuated to open the contact 238 and close the contact 246, thereby setting up a circuit to the solenoid 178. The circuit, however, is not completed until the contacts 231 and 234 are again closed at the end of the return stroke of the piston 66.

At the end of the period for which the timer 292 is set, the timer 292 breaks the circuit to the solenoid 183, thereby de-energizing the same, and actuating the valve 153 to supply fluid under high pressure through the line 181 to the right-hand side of the cylinder 68. The piston 66 thereupon returns to its original position, closing the valve 60 and at the end of its return stroke closing the contacts 231 and 234. When these contacts are closed, the solenoid 178 is actuated to reverse the position of the valve 161 and supply fluid under high pressure to the top of the cylinder 28 for retracting the piston 26 and the platen 22. When the platen 22 reaches the lower end of its stroke, the switch 237 is again actuated to close the contacts 236 and 238 and the switches 241 and 217 are opened, thereby resetting the system in its original position. Release of the pressure in the duct 175 by actuation of the valve 161 causes the pressure-actuated switch 295 to open. The molding cycle is now completed and the molded articles may be ejected in the usual manner. The system is then ready for a second cycle of operation when the manual switches 212 are again closed.

As a result of repeated injection-molding operations, the molding material in the injection cylinder 34 becomes depleted and the plunger 70 falls to successively lower positions. When the plunger 70 falls to a position such that the switch 254 is closed, a circuit is established from the lead 230 through the lead 252, contacts 253 and 265, and lead 266 to coil 267 of the relay 222, thereby actuating the relay and breaking the contacts 223 and 221 and closing contacts 260 and 261. Breaking of the contacts 221 and 223 de-energizes the solenoid 187 and actuates the valve 157 to relieve the pressure at the top of the cylinder 76. Closing of the contacts 260 and 261 sets up a circuit from the lead 252, 255, switch 257, lead 259 through contacts 260 and 261 and lead 262 to the solenoid 194, thereby actuating the valve 159 to supply fluid under high pressure through the line 191 to the top of the cylinder 86 and through the delay action sequence valve 193 to the top of the cylinder 56. The pressure in the top of the cylinder 86 causes the piston 84 to be depressed, thereby forcing the plunger 80 into the storage cylinder 36 and building up pressure on the molding material therein. The delay action of the valve 193 is designed to allow the pressure to be built up in the storage cylinder 36 before the valve 46 opens. Thereafter, the pressure is supplied to the top of the cylinder 56 to open the valve 46. The pressure of the plunger 80 thereupon forces the molding material from the storage cylinder 36 through the valve 46 into the injection cylinder 34, recharging the cylinder 34 and causing the plunger 70 to rise. This continues until the plunger 70 reaches a position to open the switch 257. When this occurs, the circuit to the solenoid 194 is broken and the valve 159 is shifted to supply high pressure fluid through the line 190 to the lower part of the cylinder 56 for elevating the piston 54 and closing the valve 46. The fluid pressure is then supplied through the delay action valve 192 to the lower part of the cylinder 86 for elevating the piston 84 and the plunger 80 to relieve pressure on the reservoir 36. During the period while the switch 254 is open, a holding circuit for the coil 267 is established through the contacts 269 and 270.

The system thus operates automatically to replenish the charge in the injection cylinder 34 as required. The cylinder 34 may be recharged manually when the supply of reserve material becomes low. The manual valve 155 permits pressure to be supplied through the line 185 to the bottom of the cylinder 76 when it is desired to relieve the pressure on the molding material in the cylinder 34 for recharging.

Though specific valves have been described for controlling the extrusion and the transfer respectively, it is to be understood that the invention is not restricted thereto and that any other types of valves can be used.

This invention provides an injection-molding machine wherein, due to the large bulk of molding material contained within the single heating unit and due to the long time during which the molding composition is held at the required temperature, temperature distribution within the mold can be controlled with extreme accuracy and uniform distribution within less than 5° F. can be accomplished. After the composition in the two cylinders has reached a uniform temperature, such uniform temperature can be maintained at all times while the machine is in operation. After the dry molding composition has been fed into the two cylinders, no moisture will have access to the molding compositions since the cylinders are sufficiently sealed by their respective plungers. This seal also prevents oxygen from reaching the heated molding composition, thus protecting it from excessive heat degradation.

Due to the details of construction of the machine, the consistency of the molding composition at molding temperatures will not influence the operation of the machine in any way. The molding composition may be sticky or in any stage of low viscosity. Since pressure is maintained on the molding at all times, and due to the uniformity of temperature within the molding composition, molding can be accomplished at pressures between 100 and 2,000 pounds per square inch, whereas pressures of from 10,000 to 30,000 pounds per square inch are required by conventional methods of molding.

Since it is obvious that many changes and modifications can be made in the above-described details without departing from the nature and spirit of the invention, it is to be understood that the invention is not to be limited to the details described herein except as set forth in the appended claims.

I claim:

1. In an injection-molding machine, an injection cylinder for containing the molding composition, a storage cylinder for containing a reserve of the molding composition, means providing communication between said cylinders, a valve controlling said communication, means including a plunger adapted to apply pressure on the contents of said injection cylinder to extrude the composition from said injection cylinder, a plunger normally sealing the contents in the storage cylinder, means to actuate the injection cylinder plunger to apply pressure on the contents in said injection cylinder, and means actuated by the injection cylinder plunger to apply pressure on the storage cylinder plunger when the injection cylinder plunger reaches a predetermined level, to release the pressure on the injection cylinder plunger, and to actuate the valve to permit communication between said cylinders after the storage cylinder plunger is actuated.

2. In an injection-molding machine, an injection cylinder for containing the molding composition, a storage cylinder for containing a reserve of the molding composition, means providing communication between said cylinders, a valve controlling said communication, a nozzle cooperating with the bottom of said injection cylinder and through which the molding composition is extruded, a plunger adapted to apply pressure on the contents of said injection cylinder, die members in which the extruded composition is injected, a platen carrying said die members, means to move said platen at predetermined intervals to dispose said die members in and out of molding position, a valve controlling the extrusion from said injection cylinder through said nozzle, means actuated by said platen to actuate said valve, a plunger normally sealing the contents in the storage cylinder, means to actuate the injection cylinder plunger to apply pressure on the contents in said injection cylinder, and means actuated by said injection cylinder plunger to apply pressure on the storage cylinder plunger at a predetermined time, to release the pressure on the injection cylinder plunger, and to actuate the valve to provide communication between said cylinders after the storage cylinder plunger is actuated.

3. In an injection-molding machine, an injection cylinder for containing the molding composition, a storage cylinder for containing a reserve of the molding composition, means providing communication between said cylinders, a valve controlling said communication, a jacket surrounding said cylinders and valve to provide a reservoir for a heating medium, means including a plunger adapted to apply pressure on the contents of said injection cylinder to extrude the composition from said injection cylinder, a plunger normally sealing the contents in the storage cylinder, means to actuate the injection cylinder plunger to apply pressure on the contents in said injection cylinder, and means actuated by the injection cylinder plunger to apply pressure on the storage cylinder plunger when the injection cylinder plunger reaches a predetermined level, to release the pressure on the injection cylinder plunger, and to actuate the valve to permit communication between said cylinders after the storage cylinder plunger is actuated.

4. In an injection-molding machine, an injection cylinder for containing the molding composition, a storage cylinder for containing a reserve of the molding composition, means providing communication between said cylinders, a valve controlling said communication, a jacket surrounding said cylinders and valve to provide a reservoir for a heating medium, a nozzle cooperating with the bottom of said injection cylinder and through which the molding composition is extruded, a plunger adapted to apply pressure on the contents of said injection cylinder, die members in which the extruded composition is injected, a platen carrying said die members, means to move said platen at predetermined intervals to dispose said die members in and out of molding position, a valve controlling the extrusion from said injection cylinder through said nozzle, means actuated by said platen to actuate said valve, a plunger normally sealing the contents in the storage cylinder, means actuated by said platen to actuate the injection cylinder plunger to apply pressure on the contents in said injection cylinder, and means actuated by the injection cylinder plunger to apply pressure on the storage cylinder plunger at a predetermined time, to release the pressure on the injection cylinder plunger, and to actuate the valve to provide communication between said cylinders after the storage cylinder plunger is actuated.

5. An injection-molding apparatus comprising an injection cylinder containing molding material, a plunger to apply pressure to said material, a discharge passage communicating with said cylinder, a valve normally closing said passage, a platen carrying a die mounted to be advanced to molding position and to be retracted therefrom, means to advance said platen to molding position, pressure means actuated by the advance of said platen to actuate said plunger to apply molding pressure to said molding material, means actuated in response to the elevation of said platen for opening said valve for a predetermined period of time for the injection of the molding material, means responsive to the closing of said valve for retracting said platen, and means actuated by the retraction of said platen to relieve the pressure on the plunger.

6. An injection-molding apparatus comprising an injection cylinder containing molding material, a plunger to apply pressure to said material, a reservoir containing additional material, a plunger to apply pressure to the material in said reservoir, a valve interconnecting said cylinder with said reservoir, means responsive to the lowering of the cylinder plunger to a predetermined position to apply pressure to said reservoir plunger for exerting pressure on the material in said reservoir, timed means to open said valve after the material in said reservoir has been brought under pressure whereby material is supplied to said reservoir to replenish said cylinder, and means responsive to the elevation of said cylinder plunger to a predetermined position to first close said valve and then relieve the pressure on said reservoir plunger.

7. In an injection-molding apparatus, an injection cylinder containing injection-molding material, a plunger in said injection cylinder to apply pressure to said material, a discharge passage communicating with said injection cylinder, a valve to close said passage, a platen carrying a mold and movable to and from molding position in registration with said discharge passage, pistons connected to actuate said platen, said plunger and said valve, hydraulic cylinders associated with said pistons, a source of fluid pressure, means including hydraulic valves connecting said source to each of said hydraulic cylinders for controlling the actuation of said pistons, means including an electric circuit connected to actuate the platen control valve to cause the platen piston to elevate the platen into molding position, an electric switch actuated by elevation of said platen, an electrical circuit including said switch and connected to actuate the plunger control valve for causing said plunger to apply pressure to the molding material in said injection cylinder, an electric circuit connected to actuate the valve control cylinder to open said valve for molding, a pressure-actuated switch in said last circuit responsive to hydraulic pressure built up in said platen piston cylinder to close said last circuit, timed means for de-energizing said last circuit after a predetermined molding period for again closing said valve, and electrically controlled means responsive to the closing of said valve for reversing the position of the platen control valve to retract said platen.

8. An injection-molding system comprising an injection cylinder containing molding material, a first plunger to apply pressure to said material, a first hydraulically actuated piston to actuate said plunger, a discharge passage communicating with said cylinder, a first valve normally closing said passage, a second hydraulically actuated piston connected to control said valve, a platen to carry a mold and mounted to advance to molding position and to be retracted therefrom, a third hydraulically actuated piston connected to actuate said platen, a source of fluid pressure connected to actuate the respective pistons, a first solenoid-controlled valve connected to control the supply of said fluid pressure to said third piston for elevating and retracting said platen, a second solenoid-actuated valve connected to control the supply of fluid pressure to said second piston for closing or opening said valve, a third solenoid-controlled valve connected to control the fluid pressure to said first piston for applying pressure to or relieving the pressure on said first plunger, an energizing circuit for said first solenoid-controlled valve including a manual switch for initiating the operation thereof to elevate said platen, a second electric circuit controlling said third solenoid-controlled valve, a second switch means actuated in response to the elevation of said platen to energize said second circuit for causing said first plunger to exert pressure on the molding material, a third electric circuit connected to actuate said second solenoid-controlled valve including a switch responsive to the elevation of said platen and connected to energize said third circuit to open said first valve and a timer connected to de-energize said third circuit after a predetermined period of time to close said first valve, a fourth electric circuit connected to control said first solenoid-controlled valve for reversing the fluid pressure on said third piston and retracting said platen, a switch responsive to the closing of said first valve to actuate said fourth circuit for retracting said platen, and means responsive to the retraction of said platen to open said second switch means for thereby relieving the pressure on said plunger, a reservoir for molding material, a passage connecting said reservoir with said cylinder, a second valve normally closing said passage, fluid-actuated pistons connected to apply pressure to the material in said reservoir and to actuate said second valve, a fourth solenoid-actuated valve connected to control the fluid pressure supplied to said reservoir, a relay connected to control the energization of said fourth solenoid-actuated valve, a third switch means responsive to the lowering of said plunger to actuate said relay, a fourth switch means actuated by said relay for actuating said fourth solenoid-actuated valve to apply pressure to said material in said reservoir and to open said second valve for replenishing said cylinder from said reservoir, and means responsive to the elevation of said plunger for releasing said relay for closing said second valve and for relieving the pressure on said reservoir, and delay action valves in said fluid pressure line to cause said second valve to open after pressure has been applied to said reservoir and to close before the pressure in said reservoir has been relieved.

9. In an injection-molding machine, an injection cylinder for containing the molding composition, a storage cylinder for containing a reserve of the molding composition, means providing communication between said cylinders, a valve controlling said communication, means including a plunger adapted to apply pressure on the contents of said injection cylinder to extrude the composition from said injection cylinder, means to actuate the injection cylinder plunger to apply pressure on the contents in said injection cylinder, pressure means applying pressure to said storage cylinder, and means actuated by the injection plunger when the injection cylinder plunger reaches a predetermined level to actuate said pressure means so as to apply pressure on the storage cylinder, to release the pressure on the injection cylinder plunger, and to actuate said valve to permit communication between said cylinders after the storage cylinder pressure means is actuated.

EMERIK I. VALYI.

REFERENCES CITED

The following references are of record in the file of this patent:

UNITED STATES PATENTS

| Number | Name | Date |
|---|---|---|
| 1,993,942 | Novotny | Mar. 12, 1935 |
| 2,043,584 | Husted | June 9, 1936 |
| 2,107,190 | Shaw | Feb. 1, 1938 |
| 2,187,212 | MacMillin | Jan. 16, 1940 |
| 2,202,140 | Burroughs | May 28, 1940 |
| 2,359,840 | Goessling | Oct. 10, 1944 |